Sept. 26, 1967     K. ACKERMANN ETAL     3,343,452
POINTER FOR A SLIDE PROJECTOR
Filed Aug. 20, 1965     4 Sheets-Sheet 1
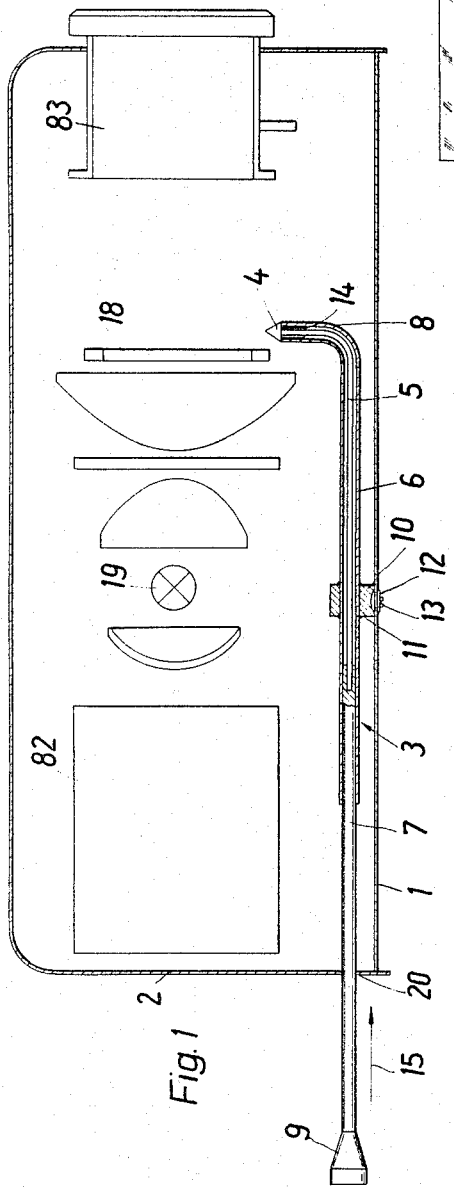
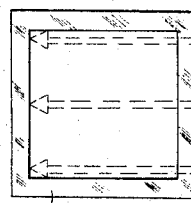
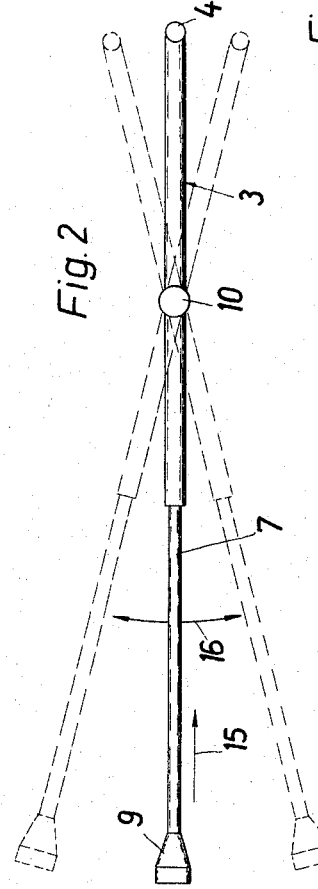
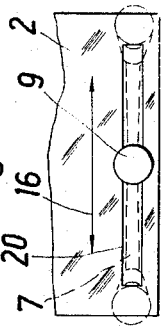
Inventors:
Karl Ackermann
Klaus Bartos
Siegfried Schöne
By: Spencer & Kaye
Attorneys

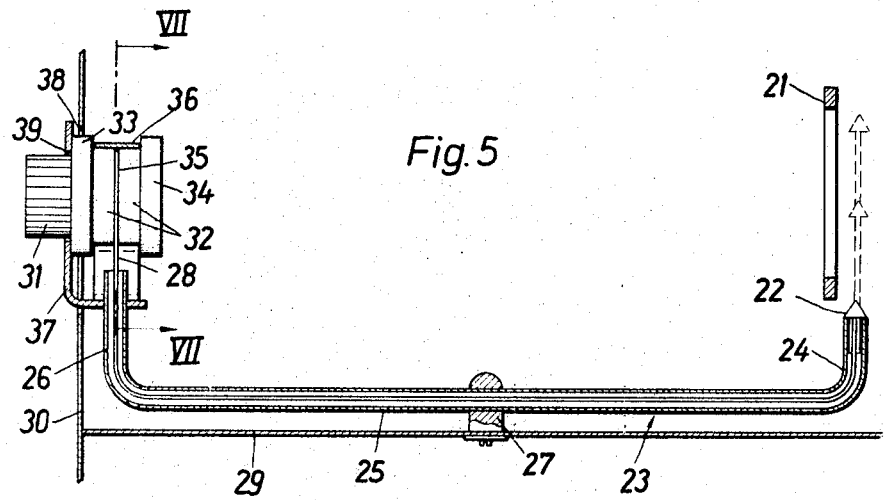
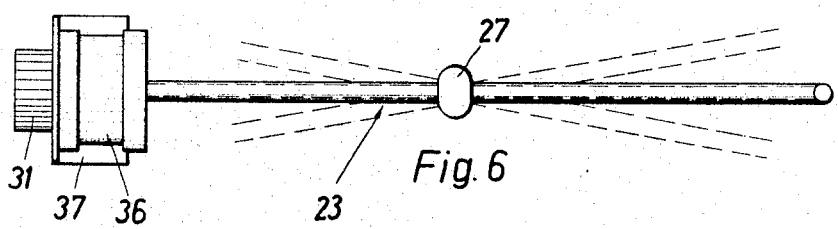
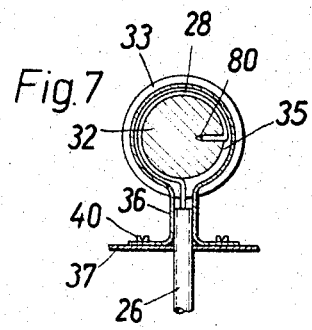
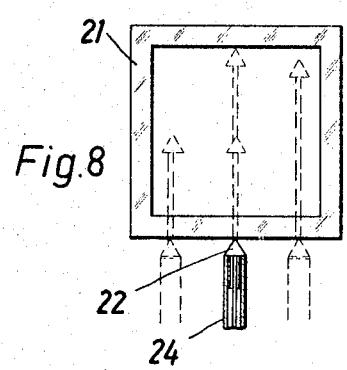

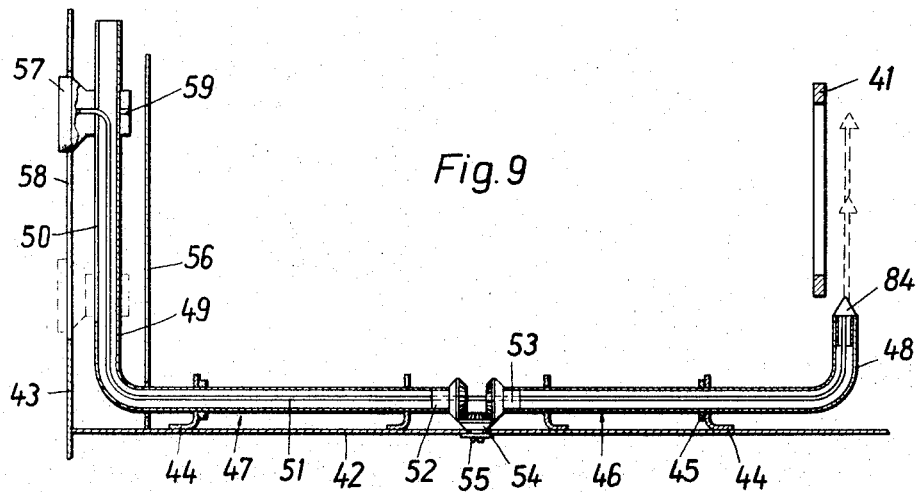
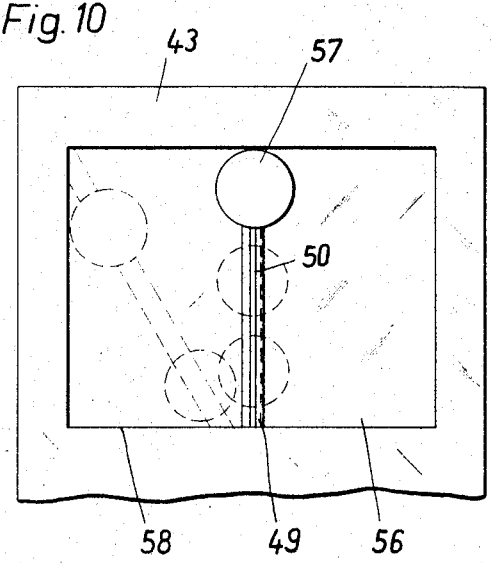
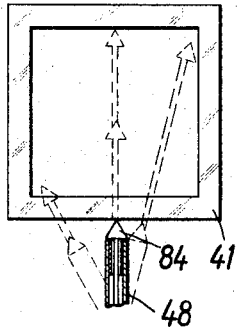

Sept. 26, 1967 K. ACKERMANN ET AL 3,343,452
POINTER FOR A SLIDE PROJECTOR
Filed Aug. 20, 1965 4 Sheets-Sheet 4
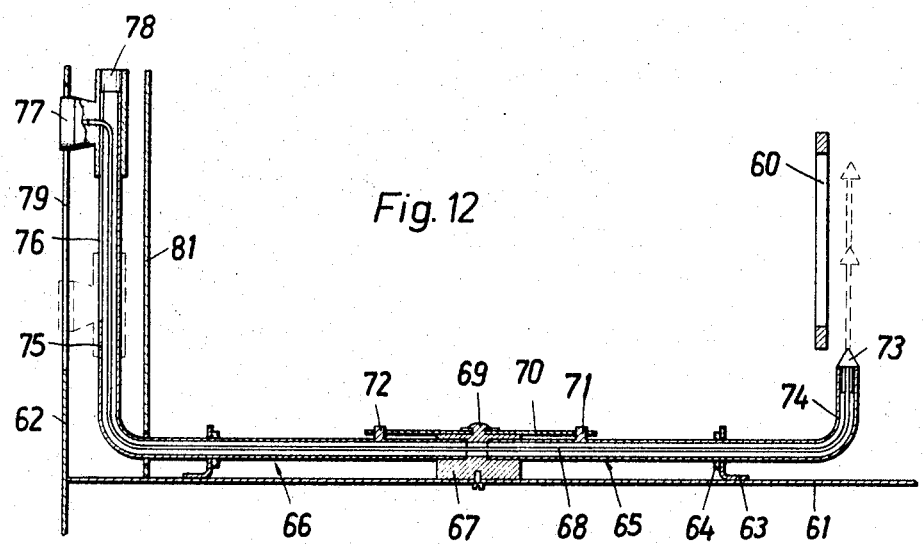
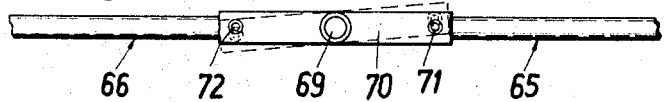
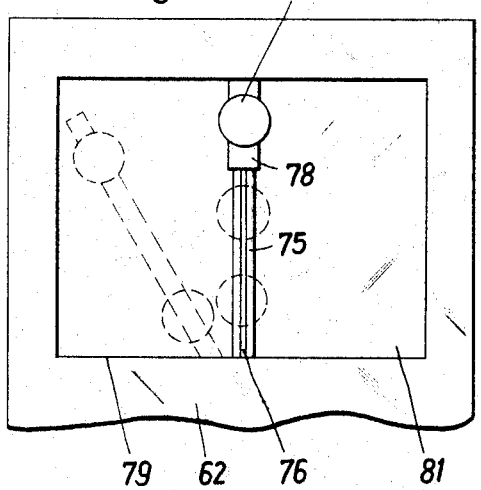
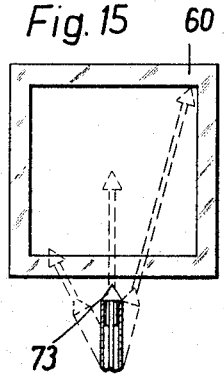
Inventors:
Karl Ackermann
Klaus Bartos
Siegfried Schöne
By: Spencer & Kaye
Attorneys

United States Patent Office

3,343,452
Patented Sept. 26, 1967

3,343,452
POINTER FOR A SLIDE PROJECTOR
Karl Ackermann, Klaus Bartos, and Siegfried Schöne, Berlin, Germany, assignors to Robert Bosch Elektronik G.m.b.H., Berlin-Wilmersdorf, Germany
Filed Aug. 20, 1965, Ser. No. 481,299
Claims priority, application Germany, Nov. 17, 1964, B 79,354
15 Claims. (Cl. 88—24)

ABSTRACT OF THE DISCLOSURE

A slide projector having a device for indicating a selectable point on a projected picture. The device includes a completely or partially opaque pointer tip or similar marker in the beam path of the projector, the marker being movable within a plane located at a small distance from the plane of the picture aperture approximately parallel thereto. The marker itself is mounted on a reciprocatory element which is located in the region of the plane of movement.

The present invention relates to slide projectors having a device for indicating a selectable point on a projected picture.

When a slide is projected, the projectionist or lecturer very often desires to mark certain places on the projected picture during his lecture.

It has been the general practice to use devices which direct a light marker on the projected picture. Although these devices have served the purpose, it is necessary to provide a special light source, or to branch off a separate light beam from the projector light source. Also, these light markers are very often not readily discernible on the bright portions of the projected picture. It is also possible to utilize special flashlights in which the light is concentrated to a beam, and a light spot is provided on the projected picture. This, however, is inconvenient for the projectionist because he has to hold the flashlight steadily in his hand for the duration of marking the place on the picture.

It is therefore an object of the invention to provide a simple indicating device for accurate marking of projected pictures.

Another object is to provide an indicating device which is simple to operate and inexpensive to produce.

The invention provides a completely or partially opaque pointer tip or similar marker in the beam path of the projector, the marker being movable within a plane located at a small distance from the plane of the picture aperture approximately parallel thereto. In this manner, the marking formed by a shadow cast on the picture is made possible without requiring a special light source or a separate optical system. In fact, the original light source does not even have to be intensified.

According to one feature of the present invention, the indicator tip or similar marker is mounted at one end of a reciprocatory device such as a cable, which is longitudinally movable within a guide, rotatably or pivotably mounted in the eprojector and the other end of the reciprocatory device being provided with a handle or a knob, whereby the reciprocatory means can be longitudinally moved along the guide, and the guide can be rotated or pivoted.

Another feature of this invention includes the use of a tube as the guide wherein a flexible reciprocatory means, such as a cable, is longitudinally movable to provide a very simple construction of the device for indicating a selectable spot. Thus, it is possible, to move the indicator tip by pulling the cable out of the guide by means of the knob, in the directions of the coordinate axes of the picture aperture plane, for example to lower the indicator tip, i.e., to move it in the vertical coordinate axis, and also to influence, by laterally shifting the guide by means of the knob, the position of the indicator tip in the other, for example, the horizontal, coordinate axis of the picture aperture plane.

In accordance with another feature of the invention, the tube serving as the guide is located substantially in a plane transverse to the plane of the picture aperture, and is provided with a tip bent at right angles whereat the cable provided with the marker extends therethrough to the outside. No difficulties are encountered in bending a tube at right angles, even though the inside cross section may be distorted at the point of bending, since this inside cross section of the tube can be made to have sufficiently ample dimensions. By providing a guide sleeve, which is exactly adjusted to the cross section of the wire, at the point of exit of the bent tube end, the invention further provides that the cable leaves the bent tube end exactly in the direction of the axis of the tube end.

As the slides are placed in an inverted position in the projector and thus the sides are also reversed, the indicating device can be fashioned in such a manner that when the guide is rotated or pivoted, the indicator tip or similar marking moves in a direction opposite to the direction of movement of the knob. Therefore, if the projectionist moves the handle, for example, to the right, the shadow of the indicator tip will also move to the right on the projected picture, thereby providing a convenient indicator for the projectionist in that the movement of the marker corresponds to his movement.

Accordingly, it is another object of the present invention to provide a marker having a movement which corresponds to the movement of the projectionist.

Other features of this invention include the reversing of the direction of movement by a pivotal mounting of the tube in its central section about an axis lying parallel to the bent end of the tube, or by separating the tube in its central section by a gear sysem effecting the reversal of the direction of rotation of one of the tube portions with respect to the direction of rotation of the other tube portion.

Additional objects and advantages of the present invention will become apparent upon consideration of the following description when taken in conjunction with the accompanying drawings in which:

FIGURE 1 is a longitudinal section through a slide projector and through an indicating device according to the present invention.

FIGURE 2 is a top view of the indicating device of FIGURE 1.

FIGURE 3 is a right side view of the picture aperture of the projector.

FIGURE 4 is a left side view of the rear of the projector.

FIGURE 5 is a longitudinal section through a further embodiment of a device according to the present invention.

FIGURE 6 is a top view of the indicating device of FIGURE 5.

FIGURE 7 is a sectional view of FIGURE 5 along the plane VII—VII.

FIGURE 8 is a right side view of the picture aperture of the projector of FIGURE 5.

FIGURE 9 is a longitudinal section through another embodiment of a device according to the present invention.

FIGURE 10 is a left side view of the device of FIGURE 9.

FIGURE 11 is a right side view of the picture aperture of the projector of FIGURE 9.

FIGURE 12 is a longitudinal section through still another embodiment of a device according to the present invention.

FIGURE 13 is a top view of a portion of the indicating device of FIGURE 12.

FIGURE 14 is a left side view of the device of FIGURE 12.

FIGURE 15 is a right side view of the device of FIGURE 12.

Referring now to the drawings, there is shown in FIGURE 1 a slide projector having a base plate 1. The projector has a conventional projection system mounted therein, including a transformer 82, an illuminating lamp 19 supplied with power from the transformer, an optical system, a picture aperture or frame 18, and an objective lens 83 which are covered by a housing lid 2.

At a small distance from the plane of the picture aperture 18, an indicator tip 4 is mounted for movement within a plane at least substantially parallel to this plane. The indicator 4 is fastened to the end of a cable 5, by any suitable method, such as by soldering, whereby the cable serves as a reciprocatory means and is guided in a tube 3.

The tube 3 extends substantially in a plane transverse to the plane of the picture aperture 18, with its longitudinal tube portion 6 being parallel to the base plate 1. The tube is bent at one end 8 at a right angle in an upward direction and is provided at the exit opening with a guide sleeve 14 whose inside diameter allows the cable 5 to pass through with only a small amount of play. The guide sleeve may be fastened to the tube by any suitable method, such as by soldering to the inner wall of the tube end. Therefore, the indicator tip 4 always moves exactly along the central axis of the upwardly bent end 8 of the tube, i.e., the tip is vertically movable upwardly or downwardly, when the cable is pushed back and forth within the tube 3.

The tube 3 is turnable, which, for the purpose of this description, includes rotational pivotal movement, by means of a small support column 10, having the longitudinal tube 6 affixed within its cross bore by any suitable method, such as by soldering. The tube 3 turns about an axis which is parallel to the bent end 8, with the longitudinal tube moving in a plane parallel to the base plate 1 and the indicator tip 4 travelling to and fro between the two lateral edges of the picture aperture. The support 10 is easily rotatable in a bore of the base plate 1 because a spacer disc 11, being somewhat thicker than the base plate 1, and a capping disc 12 are mounted by means of a screw 13 at its lower front surface.

A telescoping rod 7 is provided within the left end of the longitudinal tube 6 for movement therein, with the cable 5 being fastened to the right end of the telescopic rod 7, as for example by soldering. If the telescopic rod is pushed, by means of a knob-like handle 9, which may be threaded onto the telescopic rod, in the direction of arrow 15 to the right, the cable 5 is correspondingly displaced and the indicator tip 14 approaches the upper edge of the picture aperture 18, as shown in FIGURE 3. The inside cross section of the tube 3 is nominally larger than the cross section of the cable so that, even if there is a deformation of the tube at the bend between the longitudinal tube 6 and the bent end 8, the cable remains easily displaceable.

The telescopic rod 7 extends through a horizontally extending slot 20 having a frame, as shown in FIGURE 4, in the rear wall at the left-hand side of the lid of the casing 2. As shown in FIGURE 1, the movement of the telescopic rod to the right is limited by the handle 9 coming to rest against the portion of the casing lid surrounding slot 20, while the telescopic rod can be pulled to the left only until the indicator tip 4 contacts the upper edge of the bent tube end 8.

From FIGURES 2 and 4, it can be seen that, by pivoting the handle 9 in the direction of an arrow 16, the telescopic rod 7 and thus the entire tube 3 is also pivoted with the indicator tip 4 being laterally displaced. Although the indicator tip actually travels in an arc, the angle of the arc is small and therefore the indicator may be considered to move within a plane substantially parallel to the plane of the picture aperture 18, since the movement out of the parallel plane is negligible.

When the projectionist stands behind the slide projector, whose lower portion is shown in FIGURE 4, and moves the handle 9 to the right, the indicator tip 4 travels to the left, and the shadow of the indicator tip on the projected picture moves to the right. If the handle 9 is pushed into the device, the indicator tip 4 moves upwardly and thus the shadow of the indicator tip on the projected picture moves downwardly, since the picture is inverted and the sides reversed from the position within the projector.

In order to keep the end of the telescopic rod 7 which projects from the read side wall of the casing lid 2 from becoming an obstacle, it may be made callapsible upwardly into a rest position by means of a joint, which is not shown. Furthermore, in order to prevent the indicator tip 4 from hitting the upper edge of the bent tube end 8 too hard and separating from the cable upon too vigorous a pulling of the handle 9, it is possible to provide a longitudinal slot in the wall of tube 3 located to the left of the support column 10, and to mount a cross pin on the circumference of the telescopic rod 7, with the pin engaging the longitudinal slot and limiting the movement of the telescopic rod in both directions. Thus, this longitudinal slot and the cross pin prevent twisting of the telescopic rod and thereby prevent twisting of the cable within the tube 3.

In the device shown in FIGURES 5 to 8, a tube 23 serves as the guide for a cable 28 carrying at its right end an indicator tip 22 and being wound upon a drum 32 at its left end. The tube 23 comprises a horizontal longitudinal tube 25, a right end 24 bent upwardly at a right angle, and an upwardly bent left end 26 on which the drum 32 is rotatably mounted about a horizontally extending axis.

The roll 32 is provided at the center of its longitudinal extension with a circumferential groove 35, having a cross bore 80 wherein the end of the cable 28 is fastened by any suitable means, such as a set screw which is not illustrated. If the drum is rotated, with reference to FIGURE 7, in a counter-clockwise manner, the cable resting in the groove is unwound and the indicator tip 22 is correspondingly raised in front of a picture aperture 21.

The drum 32 is rotatably mounted by an encircling supporting bracket 36 with a lateral sliding of the drum from the bracket being prevented by two limit discs 33, 34, which can be fixedly connected with the drum or can be made as a part thereof. A handle 31 for the drum, shown as a turning knob, can also be made as a part of the drum.

As shown in FIGURE 7, the base of the supporting bracket 36 is threadedly connected, by means of two screws 40, to the horizontal leg of an angle bracket 37, which is mounted at the upwardly bent end 26 of the tube 23 by any suitable method, such as by soldering. The vertical leg of the angle bracket with its bore 39 serves as further support for the knob-like handle 31 and thus for the drum 32.

The entire tube 23 can be pivoted about a small support pin 27 which can be mounted on the base plate 29 in a rotatable manner, in the same way as the support column 10 of FIGURE 1. The lateral movement of the portion of drum 32 extending out of the left rear side wall 30 of the casing lid, and of the angle bracket 37, is made possible by a slot 38 provided in this rear side wall.

If the turning knob-like handle 31 is pivoted to one side, the indicator tip 22 is deflected to the opposite side, and the shadow of the indicator tip on the projected picture is thereby deflected to the original side, and when the handle is turned, the indicator tip is lifted and its shadow is thereby lowered.

In the device illustrated in FIGURES 9 to 11, the tube serving as guide for a cable 51 is separated and comprises a right tube section 46 and a left tube section 47.

Both tube sections are rotatably carried in angle brackets mounted to the base plate 42, and a supporting ring 45 fixedly mounted to each section is positioned against angle brackets 44 to prevent a displacement of the sections to the right or left.

Bevel gears 53, 52, are attached to the inner front surfaces of the tube sections 46, 47, as, for example, by soldering the rear pivots of these gears within each of the tube sections. These pivots and gears have bores so that the cable 51 can pass therethrough. A further bevel gear 54 which forms a reversing gear together with the two gears 52, 53, is rotatably connected with the base plate 42 by means of a screw 55, in similar manner as the supporting pin 10 with the base plate 1 in FIGURE 1.

The right-hand tube section 46 has an end 48 which is bent upwardly at a right angle, so that an indicator tip 84 can project therefrom in the vertical direction in front of a picture aperture 41. The left-hand tube section 47 has an end 49 which is bent upwardly at a right angle, at which a handle 57 can be moved from an elevated position into a lower position indicated in dashed lines, as illustrated in FIGURE 9, whereby the cable 51 then conveys the indicator tip 84 upwardly.

The knob-shaped handle 57 is provided with a transverse bore whose inside diameter is somewhat larger than the circumference of the tube end 49, to provide a sleeve-type arrangement and with an axial bore 59 wherein the left end of the cable 51 is fastened by a suitable means, such as a set screw, which is not shown.

A longitudinal slot 50 provided in the wall of the tube end 49 as shown in FIGURE 9 and in FIGURE 10, permits the handle 57 to be moved up and down with a corresponding movement of the cable 51. If the handle is then pivoted laterally in an aperture 58 of the rear side wall 43 of the lid of the casing, not considering the position of the handle 57 with respect to the vertical, the left tube section 47 turns in the mountings formed by the angles 44. This turning about an axis which is transverse to the bent end 48 is transmitted, via the bevel gears 52, 54 and 53 of the reversing gear, to the right tube section 46 with the right section rotating in the opposite direction from that of the left section 47. Therefore, the rotation of the right tube section 46, the right tube end 48 is also turned. Thus, when the handle 57 is pivoted to the left, the indicator tip 84 will be deflected to the right, as indicated in FIGURE 11, and the shadow of the indicator tip on the projected picture will be pivoted to the left.

A cover plate 56 fastened to the base plate 42 is provided as a protective device so that it is impossible to reach through the frame of the aperture 58 into the interior of the projector.

In the device illustrated in FIGURES 12 to 15, the tube serving as the guide for a cable 68 is separated and comprises a right tube section 65 and a left tube section 66. Each tube section is partially rotatably mounted in an angle bracket 63 fastened to a base plate 61 and a supporting ring 64 similar to ring 45 of FIGURE 9, is positioned against the angle brackets. Each tube section 65 and 66 is partially mounted in lateral bores of a supporting bracket 67 fixedly screwed onto the base plate 61. The supporting bracket is provided, in addition to the two above-mentioned bores, with a bore passing therethrough so that the cable can extend therethrough freely.

The construction of the upwardly bent tube end 75 and the handle 77 according to FIGURE 12 corresponds approximately to the tube end and handle of FIGURE 9. The handle can be shifted on the tube end 75 by means of a sleeve 78 provided at the handle with the cable 68 passing through a longitudinal slot 76 in the tube wall. A frame having an aperture 79 in a rear side wall 62 of the housing lid permits the handle to be moved up and down, whereby an indicator tip 73 in front of a picture aperture 60 is moved upwardly out of a bent tube end 74. The aperture also permits the handle to be pivoted laterally. A cover plate 81 which corresponds to the plate 56 of FIGURE 9 is also provided as a protective device.

On the upper portion of the stationary supporting bracket 67 there is provided a pivot-type attachment 69 about which a strip-like two-armed lever 70 can be pivoted. A radially upwardly pointing follower pin 71 which is, for example, soldered to the circumference of the right tube section 65, engages a follower bore positioned close to the right end of the lever, while another follower pin 72 of the tube section 66 cooperates with a follower bore at the left end of the lever. The follower pin 72 therefore moves when the projectionist standing behind the rear side wall 62 pivots the handle 77 to the right, into the position indicated in FIGURE 13 by dashed lines. The lever 70 then causes the follower pin 71 of the right tube section 65 to be pushed to the rear, and thus this tube section 65 is rotated in the opposite direction to that of the left tube section 66. Therefore, the upwardly bent tube end 74, together with the indicator tip 73, also are pivoted into the opposite direction to that of the handle 77, and the pivoting of the handle to the right, as assumed above, thereby results in the shadow of the indicator tip on the projected picture being deflected to the right.

Thus, the present invention provides a simple and inexpensive indicating device for projectors for selectively marking desired points on a projected picture. Three embodiments have been suggested in the foregoing description for turning the tube serving as the guide for the cable, namely those corresponding to FIGURES 9, 12 and 1 or 5, respectively, the two last-mentioned figures, 1 and 5, being identical. For the possibility of pulling the cable out of the tube, likewise three possibilities have been described, namely those corresponding to FIGURES 1, 5 and 9 or 12, the two last-mentioned figures having the same effect. Theoretically, there are thus nine possibilities of combination, four of which have been illustrated in FIGURES 1, 5, 9 and 12, while the other possibilities can be developed without difficulty.

It will be understood that the above description of the present invention is susceptible to various modifications, changes and adaptations, and the same are intended to be comprehended within the meaning and range of equivalents of the appended claims.

What is claimed is:

1. In a slide projector having a picture aperture through which a light beam is passed, a device for indicating a selectable point on a projected picture, said device comprising, in combination:
    (1) an at least partially opaque marker; and
    (2) means mounting said marker within the path of the light beam for movement within a plane which is at least substantially parallel to the plane of the picture aperture and displaced a small distance therefrom, said mounting means comprising:
        (a) guide means having a longitudinal axis;
        (b) means for mounting said guide means within the projector for turning movement about a turning axis;
        (c) reciprocatory means carried by said guide means for longitudinal movement with respect thereto, one end of said reciprocatory means being located in the region of said plane of movement and said marker being mounted on said one end of said reciprocatory means; and
        (d) handle means connected at the other end of said reciprocatory means for longitudinally moving said reciprocatory means and connected to said guide means for turning said guide means about the turning axis.

2. A device as defined in claim 1, wherein said guide means is a tube.

3. A device as defined in claim 2, wherein said reciprocatory means is a flexible cable.

4. A device as defined in claim 3 wherein said tube is arranged in a plane substantially transverse to the plane of the picture aperture and is provided with an end bent at a right angle, said bent end being located in the region of said plane of movement, whereby said cable end having said marker extends from said tube at said bent end.

5. A device as defined in claim 4 wherein said means for mounting said guide means causes said marker to move in a direction opposite to the movement of said handle means.

6. A device as defined in claim 5 wherein said handle means is provided at one side of the slide projector.

7. A device as defined in claim 6, wherein said mounting means is provided at a central portion of said tube for turning said tube about a turning axis parallel to said bent end of said tube.

8. A device as defined in claim 7, wherein said handle means includes an extensible portion mounted within said guide means for horizontal movement along the longitudinal axis thereof.

9. A device as defined in claim 6 wherein said handle means includes a drum means mounted for rotational movement independent of said tube movement, and said cable being connected to said drum means, whereby rotation of said drum means causes said cable to be wound upon said drum means or unwound therefrom.

10. A device as defined in claim 6, wherein said guide means is provided with two tubular sections, said sections being separated at the central portion of said guide means, said turning means being provided at the central portion of said guide means for turning said tube sections about a turning axis which is the longitudinal axis of said guide means, said turning means comprising: means for coupling together said tube sections to impart turning movement in one sense to one of said tube sections when the other tube section is turned in an opposite sense.

11. A device as defined in claim 10, wherein said coupling means comprises:
a two-armed lever rotatable about an axis transverse to the longitudinal axis of said guide means; and
follower means mounted on each of said tube sections, said follower means on each section being coupled to a respective arm of said lever for movement therewith.

12. A device as defined in claim 10, wherein said coupling means comprises a reversing gear having first, second and third bevel gears, said first gear being coupled to one of said tube sections, said second gear being coupled to the other of said tube sections, and said third gear being coupled to said first and said second gears for transmitting motion from said first gear to said second gear.

13. A device as defined in claim 6, further comprising frame means through which said handle means extends for limiting the movement of said handle means.

14. A device as defined in claim 6 wherein said handle means includes a sleeve means slidably mounted on a portion of said guide means for vertical movement along the longitudinal axis thereof.

15. In a slide projector having a picture aperture and an objective lens through which a light beam is passed, a device for indicating a selectable point on a projected picture, said device comprising, in combination:
an at least partially opaque marker mounted between the picture aperture and the objective lens within the path of the light beam for movement within a plane which it at least substantially parallel to the plane of the picture aperture and displaced a small distance therefrom;
a tube arranged in a plane substantially transverse to the plane of the picture aperture and having an end bent at a right angle, said bent end being located in the region of said plane of movement;
a reciprocatory cable carried by said tube for longitudinal movement with respect thereto, one end of said cable extending out of said bent end within the region of said plane of movement and said marker being mounted on said one end of said cable;
handle means connected at the other end of said cable for longitudinally moving said cable and connected to said tube for turning said tube about the turning axis, whereby the movement of said handle means in one direction for turning said tube causes said marker to move in an opposite direction; and
frame means through which said handle means extends for limiting the movement of said handle means.

References Cited
UNITED STATES PATENTS

| | | | |
|---|---|---|---|
| 1,704,811 | 3/1929 | Stuber | 352—85 |
| 3,081,669 | 3/1963 | Briskin et al. | 88—24 |
| 3,189,111 | 6/1965 | Ast | 88—24 |

NORTON ANSHER, *Primary Examiner.*
RICHARD M. SHEER, *Assistant Examiner.*